United States Patent
Clapton et al.

(10) Patent No.: US 6,556,823 B2
(45) Date of Patent: *Apr. 29, 2003

(54) LOCATION DEPENDENT SERVICE FOR MOBILE TELEPHONES

(75) Inventors: Alan J Clapton, Ipswich (GB); James D Pettifor, Boxford (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/101,377

(22) PCT Filed: Jun. 5, 1998

(86) PCT No.: PCT/GB98/01659

§ 371 (c)(1),
(2), (4) Date: Jul. 9, 1998

(87) PCT Pub. No.: WO98/59503

PCT Pub. Date: Dec. 30, 1998

(65) Prior Publication Data

US 2002/0025821 A1 Feb. 28, 2002

(30) Foreign Application Priority Data

Jun. 20, 1997 (EP) .............................................. 97304358

(51) Int. Cl.[7] ................................................ H04Q 7/20
(52) U.S. Cl. ...................... 455/422; 455/433; 455/456; 455/414
(58) Field of Search ................................. 455/433, 456, 455/419, 422, 455, 432, 414, 423, 410, 403; 379/59, 58, 89

(56) References Cited

U.S. PATENT DOCUMENTS

| | | | | |
|---|---|---|---|---|
| 5,353,331 A | * | 10/1994 | Emery | 379/58 |
| 5,519,758 A | * | 5/1996 | Tabbane | 379/59 |
| 5,623,532 A | * | 4/1997 | Houde | 379/58 |
| 5,812,639 A | * | 9/1998 | Bartholomew | 379/89 |
| 5,901,359 A | * | 5/1999 | Malmstrom | 455/461 |
| 5,930,704 A | * | 7/1999 | Kay | 455/419 |
| 5,953,662 A | * | 9/1999 | Lindquist | 455/433 |
| 5,978,678 A | * | 11/1999 | Houde | 455/433 |
| 6,026,298 A | * | 2/2000 | Lamb | 455/433 |
| 6,038,445 A | * | 3/2000 | Alperovich | 455/422 |
| 6,038,451 A | * | 3/2000 | Syed | 455/455 |
| 6,038,456 A | * | 3/2000 | Colby | 455/456 |
| 6,047,179 A | * | 4/2000 | Sakamoto | 455/422 |

* cited by examiner

*Primary Examiner*—Vivian Chin
*Assistant Examiner*—John J Lee
(74) *Attorney, Agent, or Firm*—Nixon & Vanderhye P.C.

(57) ABSTRACT

A mobile telephone system provides a subscribe with services, for instance call barring and call forwarding, in dependence on the circumstances of the subscriber's mobile station. For instance, if the mobile station has a first network as its home network, the services provided are modified if it is detected that the mobile station has registered with a second network. In particular, international calls may be barred when on the home network, but permitted when on the second network so that the user may call his home country. This is carried out by having a number of different service profiles stored in the home network, for controlling the interactions between the mobile telephone and the current network, these service profiles being selected according to which network the mobile telephone is currently working to.

21 Claims, 4 Drawing Sheets

LOCATION DEPENDENT SERVICE FOR MOBILE TELEPHONES

BACKGROUND OF THE INVENTION

1. Field of the Invention

The present invention relates to mobile telephone systems, and more particularly to the provision of services to individual telephone handsets.

In the present specification, "service" means any service provided to a subscriber, other than basic telephony. Basic telephony comprises the connection of a subscriber's terminal to another terminal equipment in response to dialling by that subscriber or by a subscriber at the other terminal equipment, and the associated signalling of ringing, engaged status and number unobtainable. The services to be discussed here are sometimes referred to as "enhanced" or "extended" services.

2. Related Art

A feature of GSM (Global System for Mobile communication) mobile telephone systems is that a subscriber may elect to receive various services, for instance call barring, call forwarding and voice mail. Once the availability of such a service to the terminal is established, it remains available until either the subscriber or the network operator intervenes to change the set of enhanced services available to the subscriber.

United Kingdom Patent GB2304497 (Nortel) describes a system in which a user may "roam" from one network to another and maintain the same service set (at least, to the extent that the roamed-to network supports the relevant services). In particular it relates to a method of restricting usage of services to ensure barred services remain barred when roaming. However, a particular service set may not be appropriate in all situations. In particular, a subscriber may wish to have additional services available when roaming on a network away from the subscriber's home network. In existing systems, the subscriber must either contact the network operator and ask for the appropriate changes to be made by the operator, or modify the services by transmitting instructions using his portable telephone. This is an inconvenience to subscribers. There exist "intelligent agent" proposals to automate this process, for example as disclosed in International Patent Specification W)95/30317 (British Telecommunications pic), but these would require extensive modification to the network infrastructure and terminal logic. It is an aim of the present invention to provide this functionality within the existing network architecture. SUMMARY OF THE INVENTION According to the present invention, there is provided a method of selective service provision in a mobile telephone system including at least one mobile station and at least a first mobile telephone network, the first mobile telephone network comprising a home storage means associated with each mobile telephone for storing data relating to the services to be provided to the mobile telephone; the method comprising:

in the storage means associated with at least one of the mobile telephones, storing a plurality of service profiles, and retrieving one of the service profiles from the home storage means for transmission to a temporary storage means for controlling the operation of the mobile telephone, wherein the service profile to be retrieved is selected in accordance with a characteristic of the mobile station's current circumstances, detected by or communicated to the first mobile telephone network.

The circumstances may be defined according to which network the subscriber is currently registered with. Thus, the service provision can be automatically modified when the user roams to another network. Another exemplary, relevant circumstance is the time of day at the mobile station's location. For instance, a subscriber may wish to limit the numbers from which he can be called during certain hours, for example sleep periods.

According to the present invention, there is also provided a subscriber information processing system of a mobile telephone network including a database record for a subscriber, the record including data defining a plurality of service profiles to be provided to the subscriber, detection means for detecting a characteristic of the circumstances of the subscriber's mobile telephone, means for selecting one of the plurality of service profiles in accordance with the circumstance detected, and means for transmitting the selected service profile to a temporary store for controlling the operation of the mobile station.

A mobile telephone system may comprise a plurality of interconnected mobile telephone networks, at least one of said networks having a subscriber information processing system as defined above wherein the or each mobile telephone network comprises a temporary store for storing control information relating to mobile telephones currently registered with that network, means for identifying a home network for a mobile telephone, being the network whose subscriber information processing system has the database record for the said mobile telephone subscriber; means for transmitting to the detection means of said network the identity of said mobile telephone, and means for receiving from the subscriber information processing system of said network a service profile selected by said subscriber information processing system, for storage in said temporary store for controlling the operation of said telephone.

The subscriber information processing system may be embodied by a home location register as found in GSM mobile telephone networks. One characteristic which may determine the selection of a service profile may be the identity of the mobile network with which the mobile station is registered. In one possible arrangement, the first service profile is selected if the mobile telephone is registered with its home network, and the second service profile is selected if the mobile telephone is registered with a network other than its home network. The temporary storage means is preferably associated with the network with which the mobile telephone is currently registered.

The service functionality may be provided in general by a service processing system independent of a switching centre. In one possible implementation of the invention, a service function is implemented selectively in a first component type or a second component type of the home network in dependence on said characteristic. More specifically, the first component type may be a mobile switching centre and the second component type may be an independent service processing system.

BRIEF DESCRIPTION OF THE DRAWINGS

An embodiment of the present invention will now be described, by way of example, with reference to the accompanying drawings, in which.

DETAILED DESCRIPTION OF EXEMPLARY EMBODIMENTS

A first embodiment of the present invention will be described with particular reference to a system operating according to the GSM standards. These standards are well-known to those skilled in the art of mobile communication. Nevertheless, the reader unfamiliar with the details of GSM is directed to "*The GSM System for Mobile Communications*", Mouly, M. and Pautet, M-B., Cell & Sys, 1992, ISBN 2-9507190-0-7.

In a conventional GSM network, the processing required to provide the services is carried out at the mobile switching centre. However, it has recently been proposed that this function be removed from the mobile switching centre into a mobile service control point. This separation of functions means that network operators can introduce new services without the need to upgrade the mobile switching centres. This would allow individual network operators to provide different enhancements of the basic system, whilst the mobile switching centres, whose functionality is common to all compatible network operators to allow users to "roam" between networks, can be standardised at a relatively simple level, resulting in a reduction of the unit cost of the mobile switching centres.

Figure 1:
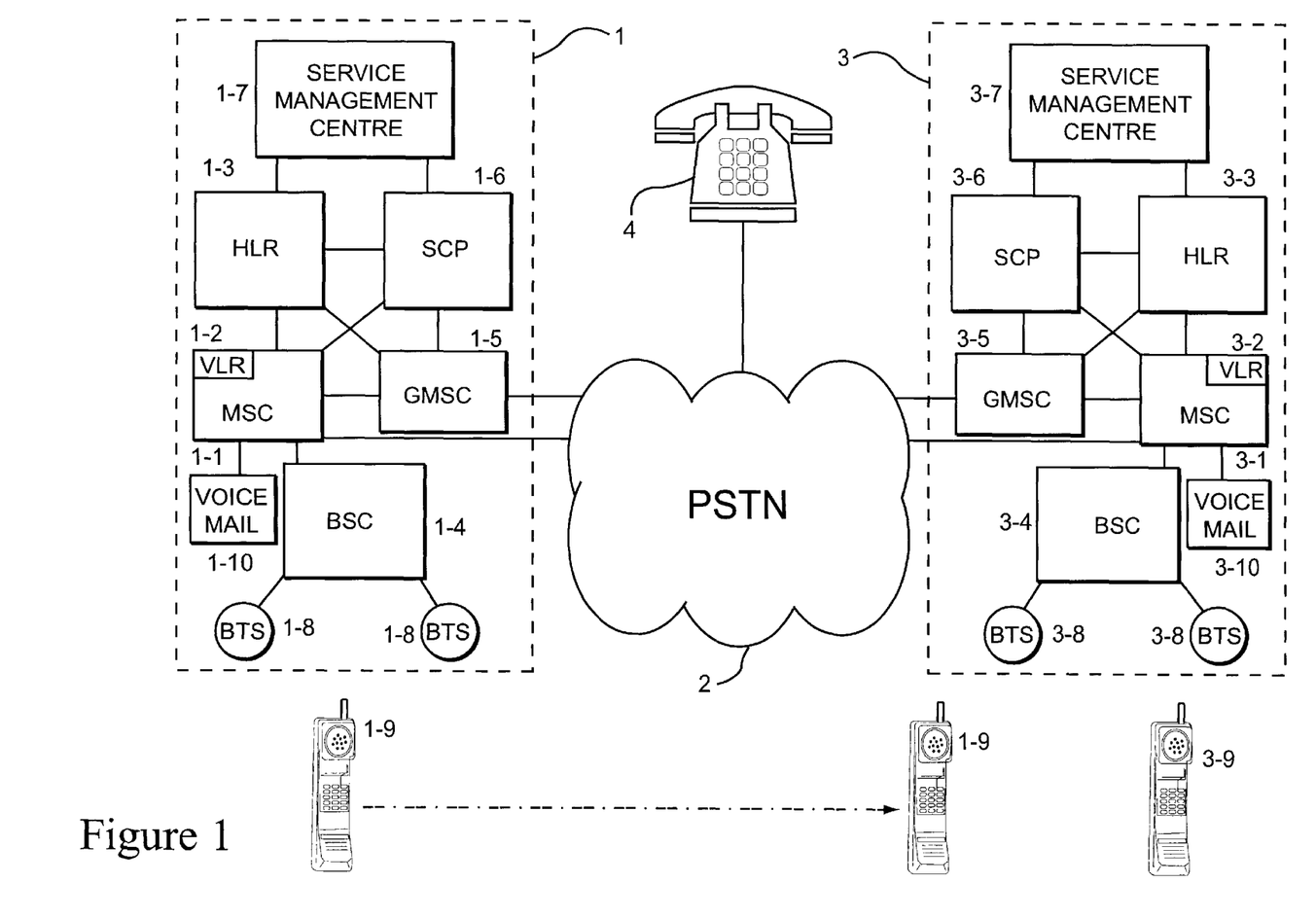
FIG. 1 is a block diagram of two mobile telephone networks operating according to the present invention.

Referring to FIG. 1, a first digital mobile telephone network 1 in a first country, for example the United Kingdom, is linked via the Public Switched Telephone Network 2 to a second digital mobile telephone network 3 in a second country, for example Germany. The mobile telephone networks 1, 3 conform generally to GSM standards, including the additional facilities offered by the facility known by the acronym "CAMEL" (Customised Application for Mobile networks Enhanced Logic). The departures of the mobile networks 1, 3 from these GSM standards will be apparent to the skilled reader from the description given below.

The first mobile telephone network, hereinafter the "home network", comprises a plurality of mobile switching centres 1-1 (only one shown), each of which is combined with a visitor location register 1-2, and is connected to a plurality of base station controllers 1-4 (only one shown). The mobile switching centre also has an associated voice mail system 1-10. The base station controllers 1-4 each control respective groups of base transmitter sites 1-8 and communicate therethrough with one or more mobile stations 1-9 (only one shown). The home network also comprises a home location register 1-3, a gateway mobile switching centre 1-5, a mobile service control point 1-6 (not a standard GSM feature), and a service management centre 1-7. The mobile switching centres 1-1 and the gateway mobile switching centre 1-5 are interconnected by a data network for conveying control and speech signals. Each mobile switching centre 1-1 is also connected to one or more base station controllers 1-4 for the exchange of control and speech signals. The home location register 1-3 includes a database containing records for the subscribers for whom the network 1 is their home network. This database can be accessed by the mobile switching centres 1-1, the gateway mobile switching centre 1-5 and the mobile service control point 1-6. The mobile switching centres 1-1 are sometimes known as "visited" mobile switching centres to distinguish them from the "gateway" mobile switching centre 1-5, which provides an initial entry point into the network 1 for calls originating from the Public Switched Telephone Network 2. In the converse direction, entry to the Public Switched Telephone Network 2 from the network 1 can be achieved directly from each of the mobile switching centres 1-1.

The home location register 1-3, the visitor location register 1-2 and the gateway mobile switching centre 1-5 are also linked to the mobile service control point 1-6. The service management centre 1-7 is linked to both the home location register 1-3 and the mobile service control point 1-6. The mobile service control point 1-6, the voicemail system 1-10 and the home location register 1-3 are configured from the service management centre 1-7.

A second mobile telephone network 3, hereinafter "the visited network"is similar to the home network 1 and comprises elements 3-1 to 3-9 analogous to those of the home network. As shown for mobile unit 1-9, a mobile unit may communicate through a base transmitter site 1-8, 3-8 of either network, according to its present geographical location.

Figure 2:
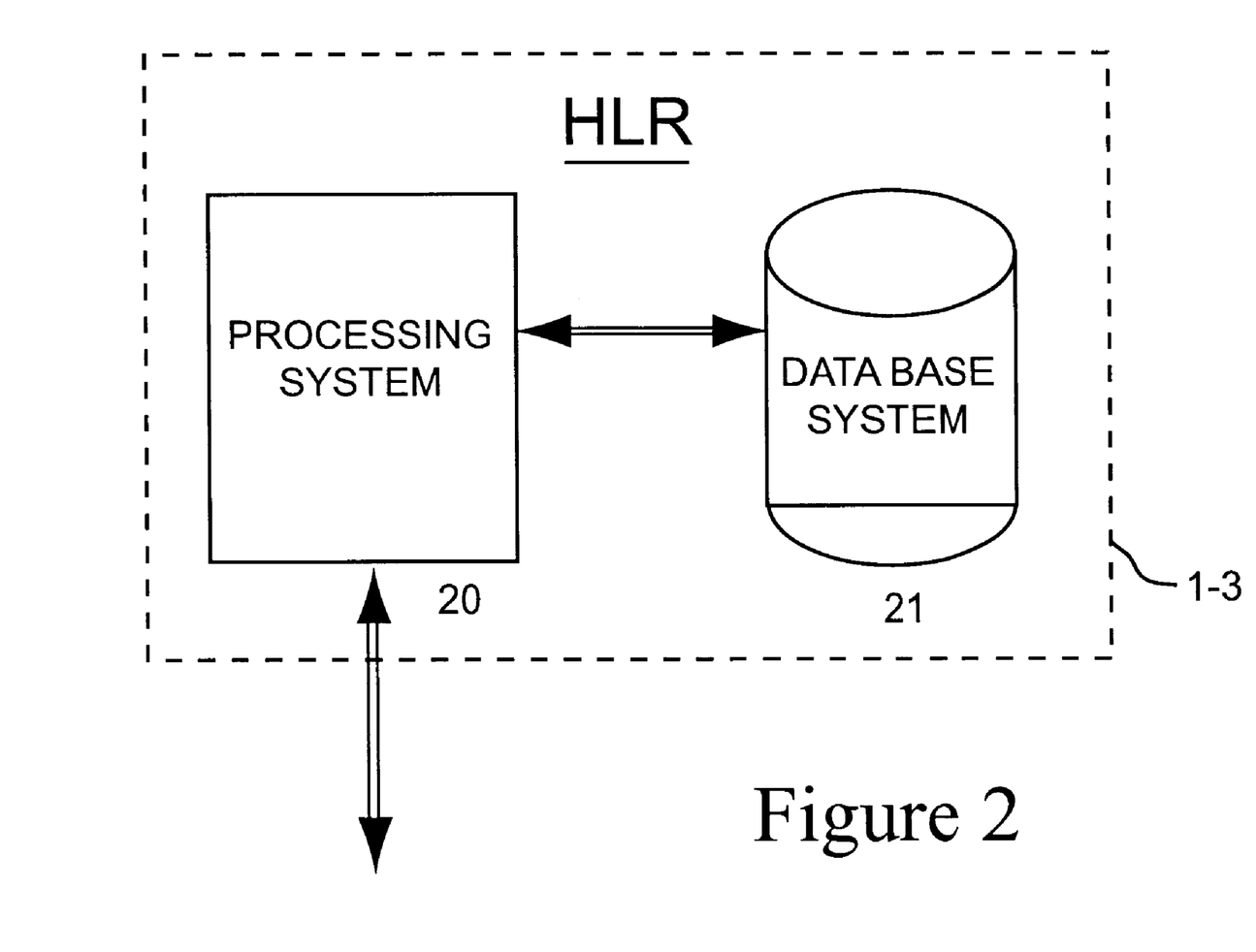
FIG. 2 is a block diagram of a home location register.

Referring to FIG. 2, the home location register 1-3 comprises a database system 21 and a processing system 20. The database system 21 contains a record for each subscriber to the network 1. The mobile switching centres, the mobile service control points and the service management centres have client-server relationships with their respective home location registers. These components issue requests to the processing system 20 which then carries out a process on the database. The process may simply involve changing a subscriber's record. On the other hand, the process may involve the retrieval of subscriber data from the database system 21 and transmission of the data to the transaction client.

The home location register 3-3 is of analogous arrangement, the database containing records relating to the subscribers of the network 3.

Figure 3:
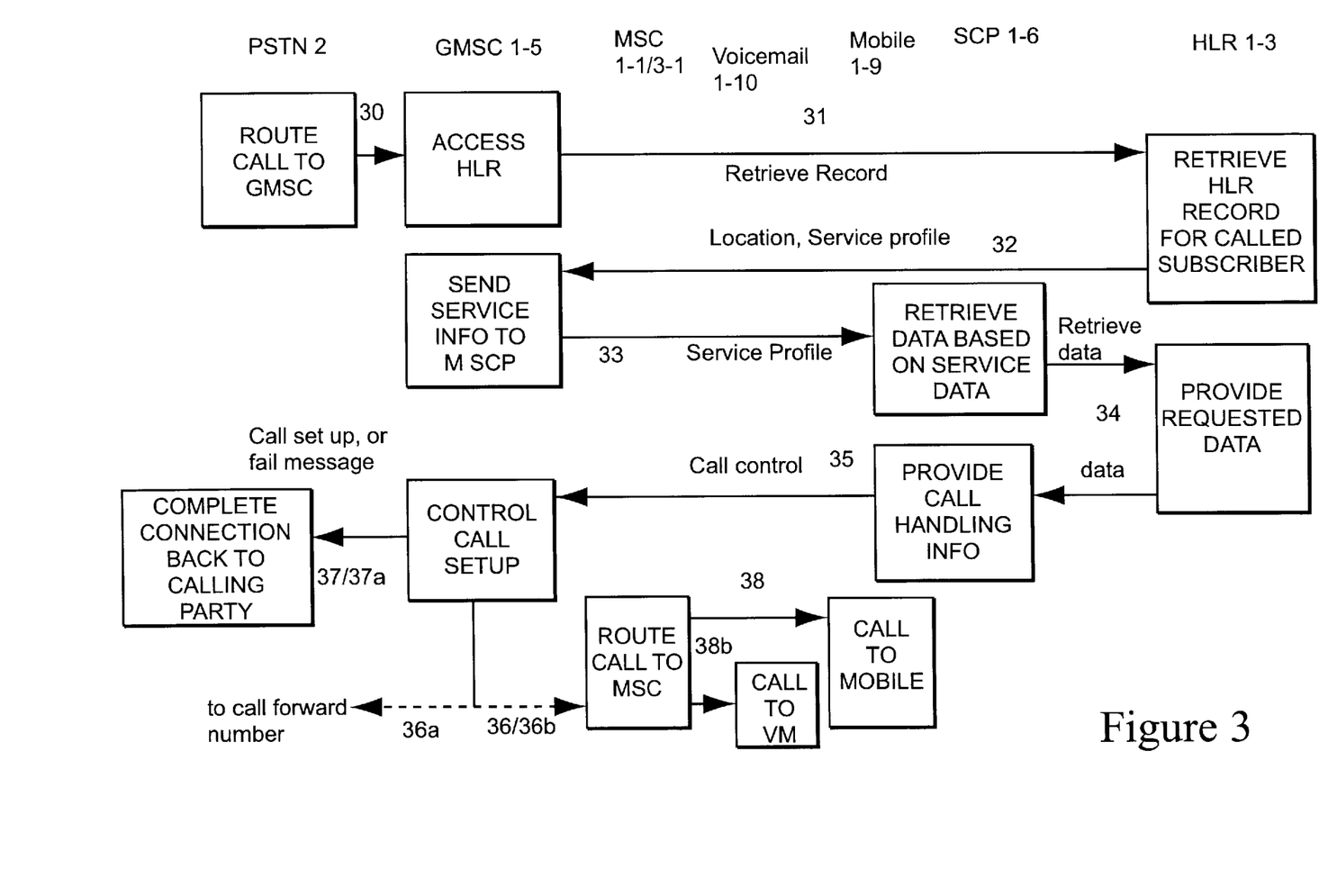
FIG. 3 depicts a call set-up procedure for calls made to a mobile unit.
Figure 4:
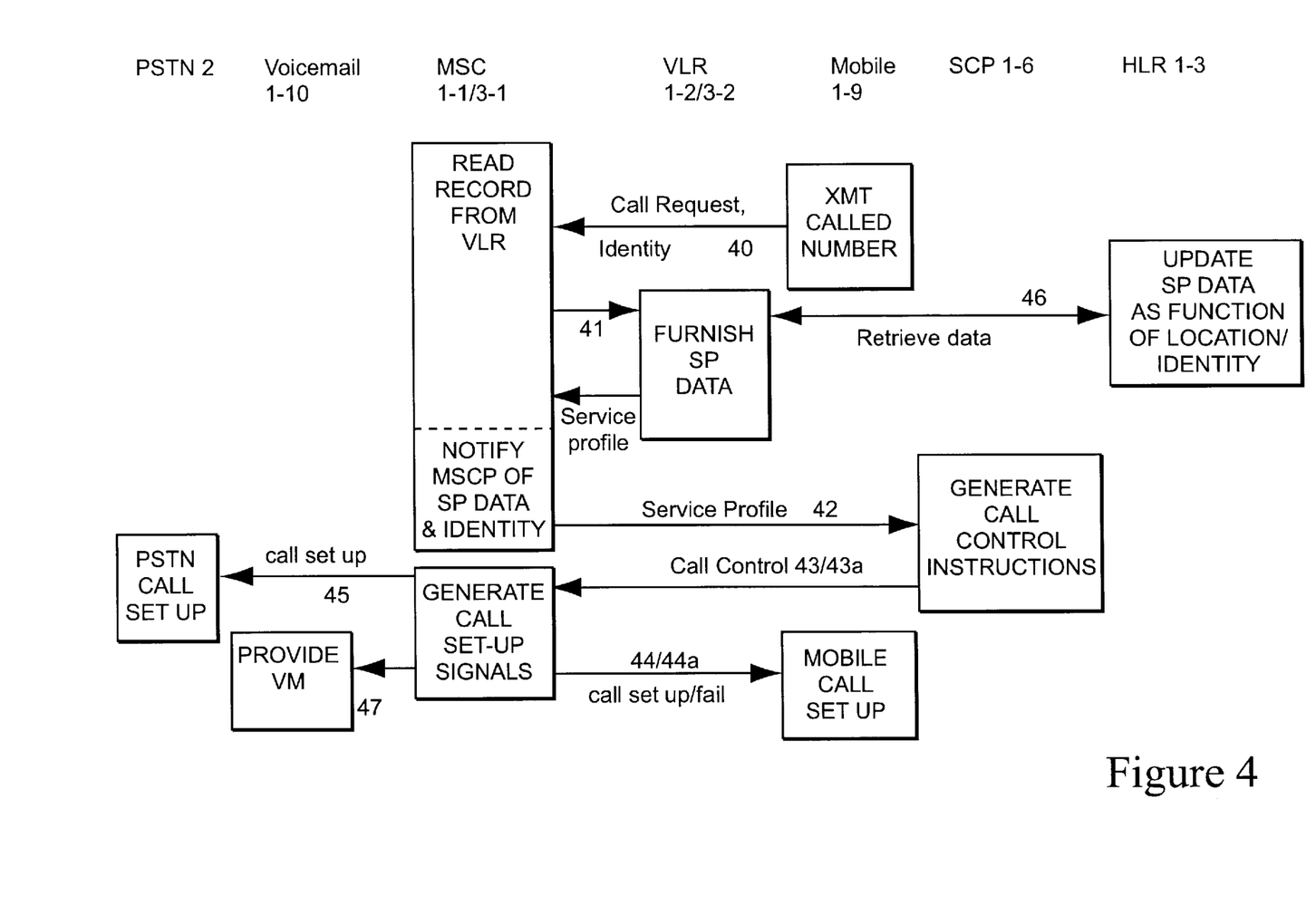
FIG. 4 depicts a call set-up procedure for calls made from a mobile unit.

The construction of components of the networks 1, 3, and the relationships between them, will become apparent from the following description of calls made between the mobile station 1-9 and a terminal equipment 4 connected to the Public Switched Telephone Network 2. Discussion will be made both of calls made to the mobile unit 1-9, (FIG. 3) and of calls made from the mobile unit 1-9 (FIG. 4). The call set-up procedures follow different patterns according to whether the mobile unit 1-9 is currently served by its home network 1 or is "roaming", that is to say, currently served by another network 3.

When a call is made to the mobile station 1-9 from the terminal equipment 4, the Public Switched Telephone Network 2 routes the call to the gateway mobile switching centre 1-5 (step 30). On receiving notification of the initiation of a call, the gateway mobile switching centre 1-5 accesses the home location register 1-3 (step 31) to retrieve the record for the called subscriber (step 32). The record includes the current location of the subscriber, and a first service marker using the CAMEL protocol. The first service marker indicates which, if any, services are active for the called subscriber. In this example, the relevant services include unconditional call forwarding (CFU), barring of all incoming calls (BAIC) and barring incoming calls made from selected numbers.

The gateway mobile switching centre 1-5 now sends the service information to the mobile service control point 1-6 (step 33). The mobile service control point 1-6 performs processes on the basis of the service information and returns to the gateway mobile switching centre 1-5 information enabling the gateway mobile switching centre 1-5 to handle the call appropriately (step 35). For instance, the gateway mobile switching centre 1-5 might be instructed to route the call to a designated number to which calls are to be forwarded, or to send a message to the terminal equipment 4 stating that the called subscriber is unavailable. The mobile service control point 1-6 has access to the home location register 1-3 so that it can retrieve information (step 34), such as designated "call forward to" numbers, necessary for its processing.

A subscriber to the network 1 may be able to control some of the contents of his or her own record in the home location register 1-3, by entering instructions using the mobile station 1-9. However, certain fields, such as those relating to subscription management, are maintained by human operators at the service management centre 1-7.

The gateway mobile switching centre 1-5 now routes the call to the mobile switching centre 1-1 with which the mobile station 1-9 is currently registered (step 36), and completes the connection back to the calling party (step 37). The mobile switching centre 1-1 then routes the call to the base station controller 1-4 which then tries to establish a radio link with the mobile station 1-9 via one of the base transmitter sites 1-8 (step 38). The details of this phase of call set up are well-known in the art. If the information received by the gateway mobile switching centre 1-5 from the service control point 1-6 (step 35) requires the call to be redirected, the call is routed accordingly (step 36a, shown for the sake of example as a call forwarded to a PSTN number (2), or step 36b, 38b shown for the sake of example as a call to the user's voicemail system 1-10). If the call is barred, an appropriate message is returned to the caller 4 (step 37a)

The process of setting up a call in the reverse direction, from the mobile station 1-9 on the home network 1 to the terminal equipment 4, will now be described.

When the subscriber wishes to place a call, he causes the mobile station 1-9 to transmit the called number to the mobile switching centre 1-1 (step 40), via a base transmitter site 1-8 and a base station controller 1-4. In addition, the mobile station 1-9 notifies the mobile switching centre 1-1 of its own identity. On receiving this notification that the subscriber wishes to have a call set up, the mobile switching centre 1-1 reads the subscriber's record from the visitor location register 1-2 (step 41). The information read from the visitor location register 1-2 includes the first service marker as described above. The mobile switching centre 1-1 then notifies the mobile service control point 1-6 of the services indicated by the first service marker and the subscriber's identity (STEP 42). One such service is the blocking of certain types of calls, for example international calls. If this service is activated, the mobile service control point 1-6 determines whether the called number is in a barred category and, if so, instructs the mobile switching centre 1-1 (step 43a) to inform the subscriber that the call cannot be made (step 44a). If the call is not barred, the mobile service control point 1-6 informs the mobile switching centre 1-1 that the call can be made (step 43) and the mobile switching centre 1-1 sends call set-up signals to the mobile unit (step 44) and the Public Switched Telephone Network 2 (step 45).

A feature of GSM is that a mobile station 1-9 can roam from the home network 1 to the visited network 3. When the mobile station 1-9 registers with the visited network 3, the visitor location register 3-2 at the mobile switching centre 3-1 requests the subscriber's home location register record from the home location register 1-3 of the home network 1. After the subscriber's record has been updated, the updated record is transmitted to the visitor location register 3-2.

When the processing system 20 (FIG. 2) detects that the mobile station 1-9 has roamed to another network, for example because the mobile unit 1-9 performs a location update or makes a call attempt through a base station 3-8 on the other network, the subscriber's record in the database 21 of the home location register 1-3 is updated, thereby allowing calls to be routed to the mobile unit if required. (Step 46 in FIG. 4 illustrates this process when it occurs during a call attempt). According to the invention, when this update takes place the first service marker in the subscriber's record in the database 21 of the home location register 1-3 is replaced by a second service marker, specifying a different set of services, for use by the subscriber when roaming. An example of these different sets of services is set out in Table 1.

TABLE 1

| Services when Subscriber Registered with Home Network | Services when Roaming |
|---|---|
| bar all outgoing international calls (BOIC) | bar all outgoing international calls except to home country (BOICexHC) |
| call forwarding conditional | unconditional call forwarding (CFU) |

A call from the terminal equipment 4 to a mobile station 1-9 roaming on the visited network 3, will now be described, again with reference to FIG. 3. This process is similar to that previously described, except that the mobile unit is contacted, if required, through the mobile switching centre 3-1 of the visited network 3, instead of the mobile switching centre 1-1 of the home network 1, and the service profile marker transmitted from the home location register 1-3 (step 32) is different, which in turn affects the call connection process (steps 36/a/b,37/a).

When a call is made to the mobile station 1-9 from the terminal equipment 4, the Public Switched Telephone Network 2 routes the call to the gateway mobile switching centre 1-5 (step 30). On receiving notification of the initiation of a call, the gateway mobile switching centre 1-5 accesses the home location register 1-3 (step 31) to retrieve the record for the called subscriber (step 32), as described above. However, the record now indicates the current location of the subscriber as being on another network 3, and the second service marker has replaced the first. In this example, the second service marker indicates, for example, that unconditional call forwarding (CFU) is now active.

As before, the gateway mobile switching centre 1-5 sends the service information to the mobile service control point 1-6 (step 33). The mobile service control point 1-6 accesses the home location register record for the called subscriber on the basis of the service information (step 34) and returns the number to which calls are to be forwarded to the gateway mobile switching centre 1-5 (step 35). This number may, for example, be the number of the voicemail service (1-10) or a number on the PSTN 2. The gateway mobile switching centre 1-5 then routes the call to the number returned from the mobile service control point 1-6 (step 36, 36a, 36b, as appropriate), and connects the call or sends a "fail" message to the calling party 4 (step 37 or 37a).

A call to the terminal equipment 4, made from a mobile station 1-9 while roaming on the visited network, will now be described, again with reference to FIG. 4. Again, the process is similar to that described above, except that the mobile unit is now co-operating with the visited network 3 instead of its home network 1, and the service profile marker retrieved (step 41) is the second one, with consequences for the call set-up process 44,45.

When the subscriber wishes to place a call whilst roaming, he causes the mobile station 1-9 to transmit the called number to the mobile switching centre 3-1 via a base transmitter site 3-8 and a base station controller 3-4. In addition, the mobile station 1-9 notifies the mobile switching centre 3-1 of its own identity (step 40). On receiving this notification that the subscriber wishes to have a call set up, the mobile switching centre 3-1 reads the subscriber's record from the visitor location register 3-2 (step 41), retrieving it from the home location register 1-3 of the home network 1 if necessary (step 46). Thus far, the process is the same as it would be if the mobile unit 1-9 were operating on its home network 1, except that the information read from the visitor location register 3-2 includes the second service marker instead of the first. The mobile switching centre 3-1 then notifies the home network's mobile service control point 1-6 of the subscriber's identity, and the services available to the mobile unit 1-9, as indicated by the second service marker (step 42). The mobile service control point 1-6 determines whether the called number is in the subscriber's home country, the country to which the subscriber has roamed, or some other country. If the called number is to neither the home country nor the roamed-to country, the service control point 1-6 instructs the mobile switching centre 3-1 to inform the subscriber that the call cannot be made (step 43a), and the mobile switching centre sends a "call failed" message to the mobile unit 1-9 (step 44a). Otherwise, the mobile service control point 1-6 informs the mobile switching centre 3-1 that the call can be made (step 43) and, in response, the mobile switching centre 3-1 sends call set-up signals to the Public Switched Telephone Network 2 (step 45) and the mobile unit 1-9 (step 44). The call may instead be to another mobile unit, or to retrieve voicemail messages, as will be discussed later A call between two mobile units 1-9, 3-9 involves both the procedure described above for making a call to a mobile unit, and also the procedure for making a call from a mobile unit, each carried out in respect of one of the two units. Either or both mobile units may be roaming. The procedures described above will operate in the same way as described above, and will not be described again in detail. However, it should be noted that the routing of such a call need not necessarily involve the public switched network 2, the PSTN 2 being replaced in FIG. 3 by the mobile switching centre 1-1/3-1, and in FIG. 4 by the gateway mobile switching centre 1-5. If both mobile units are connected to the same mobile switching centre, the call can be connected within that mobile switching centre. As has already been mentioned, the mobile switching centres of the network 1 are interconnected, so direct connection is also possible between mobile switching centres currently serving the respective mobile units without the involvement of the public switched telephone network. The gateway mobile switching centres 1-5, 3-5 of separate networks 1, 3 may also have direct interconnections.

Whilst the use of service control points using the CAMEL protocols provides flexibility, there is a performance cost, and a network operator may still wish to provide some frequently used services, e.g. voice mail, at the mobile switching centres themselves. In the case of voice mail, when a subscriber 1-9 is registered with his or her home network 1, the subscriber can access the voice mail 1-10 by dialling a short number such as 901. However, if the subscriber is to access the voice mail 1-10 when roaming on another network, it is necessary for the subscriber to dial a long number, typically of ten digits. Such a long number is difficult to remember, particularly as it is only necessary to use it when the user is not on his home network.

The present invention may be used to overcome this problem. To achieve this, the second service marker includes an element enabling voice mail access whereas the first service marker does not include such an element.

Referring again to FIGS. 1 and 4, we will now consider the situation where the subscriber wishes to access the voice mail system 1-10 whilst on the home network 1. The subscriber dials 901 into the mobile station 1-9 and the mobile station 1-9 sends the dialled number to the mobile switching centre 1-1 (step 40). The mobile switching centre 1-1 retrieves the service profile from the visitor location register 1-2, and receives no special instructions so it next identifies the dialled number as being for voice mail access notifies a mail box system 1-10 that the subscriber is requesting the subscriber's voice mail (step 47). The mail box system processes the request and returns the subscriber's voice mail for transmission to the mobile station 1-9. This process allows the voicemail 1-10 to be accessed without using the service control platform 1-6, and is therefore less demanding of processing power. However, this simple process will not operate correctly when the mobile user is roaming.

If the subscriber has roamed to the visited network 3, the mobile switching centre 3-1 will either not recognise the dialled 901 as meaningful, or it will discover that the subscriber is not entitled to the service provided by the visited network 3 in response to this number. (Even if both networks use the code 901 for voicemail access, the code, when used on the visited network, will give access to the voicemail service 3-10 of the visited network, on which the user 1-9 has no mailbox). When the mobile switching centre 3-1 identifies such a number, the mobile switching centre 3-1 then reads the subscriber's record from the visitor location register 3-2, including the second service marker (step 41). The mobile switching centre 3-1 then notifies the home network's mobile service control point 1-6 of the services indicated by the second service marker, the number dialled and the subscriber's identity (step 42). The mobile service control point 1-6 determines that the dialled number is the voice mail access number of the home network 1 and returns to the mobile switching centre 3-1 the address of the subscriber's voice mail box 1-10 (step 43). The mobile switching centre 3-1 then calls the identified voice mail box 1-10 (step 47) which then returns the subscriber's voice mail for transmission to the mobile station 1-9. Thus, the subscriber is able to access his voice mail when roaming on another network 3, using exactly the same dialling procedure as when he is registered with his home network 1.

GSM terminology has been used in the foregoing description. However, the present invention is not limited to the GSM system and is applicable also to other systems, such as the existing analogue systems known as AMPS (advanced mobile phone system), NMT, TACS (Total Access Communication System), NMT (Nordic Mobile Telephone), and existing or proposed digital systems such as DAMPS (Digital Advanced Mobile Phone System), DCS 1800 (digital communications system 1800 MHz), PCS 1900 (personal communication system 1900 MHz), Japanese PDC (personal digital cellular), US IS-96 CDMA, UMTS (universal mobile telephone system) and FPLMTS (future public land mobile telephone system).

The present invention is not limited to the services mentioned in the foregoing and it is to be expected that network operators will offer an increasing variety of services to subscribers.

What is claimed is:

1. A method of selective service provision in a mobile telephone system including at least one mobile station and at least a first mobile telephone network, and at least one further mobile telephone network, the first mobile telephone network comprising a plurality of home storage means respectively associated with each mobile telephone for storing data relating to the services to be provided to the mobile telephone, the method comprising:

in one of the storage means associated with one of the mobile telephones, storing a plurality of service profiles, and retrieving one of the service profiles from the home storage means for transmission to a temporary storage means for controlling the operation of the mobile telephone, wherein the service profile to be retrieved is selected in accordance with the identity of the mobile network with which the mobile station is registered, the identity being detected by or communicated to the first mobile telephone network, and wherein a service function is implemented selectively in a first component type or a second component type of the home network in dependence on the identity of the mobile network with which the mobile station is registered.

2. A method as in claim 1 wherein:

the first service profile is selected if the mobile telephone is registered with its home network, and the second service profile is selected if the mobile telephone is registered with a network other than its home network.

3. A method as in claim 1 wherein the temporary storage means is associated with the network with which the mobile telephone is registered.

4. A method as in claim 3 wherein:

the first component type is a mobile switching centre, and the second component type is an independent service processing system.

5. A method as in claim 4 wherein:

the mobile switching centre associated with the home network comprises service means accessible using either a first dialed number recognizable only by the home network as providing access to said service means, or a second dialed number recognizable by the at least one further network, and when a mobile telephone currently served by one of the further networks calls the first dialed number, the serving network identifies that the first dialed number is not recognized as relating to a service capable of provision to the mobile unit by the serving network, and invokes the independent processing system to translate the first number to the second dialed number, thereby allowing access to the service means provided by the home network.

6. A method as in claim 5, wherein the service means provides access to a voice-mail service maintained by the home network.

7. A method as in claim 5, wherein the second dialed number is recognizable by all networks to which the mobile telephone has access.

8. A method as in claim 1 wherein:

the first component type is a mobile switching centre, and the second component type is an independent service processing system.

9. A method as in claim 1, arranged such that the first service profile is selected if the detection means identifies that the mobile telephone is registered with its home network, and the second service profile is selected if the mobile telephone is registered with a network other than the home network.

10. A method as in claim 1, wherein two or more of the service profiles are arranged to cause the network or networks to operate in different manners, appropriate to the current circumstances, to provide the same service as perceived by the user.

11. A method as in claim 10, wherein one or more of the service profiles invokes a number translation process.

12. A subscriber information processing system of a mobile telephone network including:

for each subscriber, a respective database record including data defining a plurality of service profiles to be provided to the subscriber, detection means for detecting a characteristic of the circumstances of the subscriber's mobile telephone, means for selecting one of the plurality of service profiles of the subscriber's database record in accordance with the circumstance detected, and means for transmitting the selected service profile to a temporary store for controlling the operation of the mobile station, wherein the database record comprises a first service profile in which a specified service function is implemented in a first component type, and a second service profile in which the specified service function is implemented in a second component type.

13. A mobile telephone system comprising a plurality of interconnected mobile telephone networks, at least one of said networks having a subscriber information processing system according to claim 12, wherein each mobile telephone network comprises:

a temporary store for storing control information relating to mobile telephones currently registered with that network, means for identifying a home network for a mobile telephone, being the network whose subscriber information processing system has the database record for the said mobile telephone subscriber;

means for transmitting to the detection means of said network the identity of said mobile telephone, and means for receiving from the subscriber information processing system of said network a service profile selected by said subscriber information processing system, for storage in said temporary store for controlling the operation of said telephone.

14. A system as in claim 12, wherein two or more of the service profiles are arranged to cause the network or networks to operate in different manners, appropriate to the current circumstances, to provide the same service as perceived by the user.

15. A system as in claim 12, wherein at least one of the service profiles has access means to accessing a service means associated with another mobile telephone network.

16. A system as in claim 15, wherein the access means comprises number translation means invocable by one or more of the service profiles.

17. A system as in claim 16, comprising a plurality of interconnected mobile telephone networks, the subscriber information processing system of at least a first network having number recognition means for identifying whether a number dialed by a mobile unit currently served by the first network relates to a service capable of provision to the mobile unit by the first network;

the mobile switching centre of a second network comprising service means accessible using either a first dialed number recognizable by at least the first network as providing access to said service means, or a second dialed number recognizable only by the mobile switching centre of the second network, the number translation means being responsive to the number recognition means, and arranged to translate the second number to the first number, to allow access from the first network to the service means associated with the mobile switching centre using the second number.

18. A system as in claim 15, wherein the service means is a voice-mail system.

19. A system for processing information relating to a mobile telephone, the system comprising:

a home mobile telephone network which establishes wireless communication with the mobile telephone when the mobile telephone has a location such that the mobile telephone is registered with the home mobile telephone network; and a visitor mobile telephone network which establishes wireless communication with the mobile telephone when the mobile telephone has a location such that the mobile telephone is registered with the visitor mobile telephone network;

wherein the home mobile telephone network includes a database record having a first service profile for the mobile telephone and a second service profile for the mobile telephone which is different than the first service profile; and one of the first and second service profiles is automatically selected for controlling operation of the mobile telephone based on which one of the home and visitor mobile telephone networks the mobile telephone is currently registered to so that the first service profile is automatically selected if the mobile telephone is currently registered to the home mobile telephone network and the second service profile is automatically selected if the mobile telephone is currently registered to the visitor mobile telephone network.

20. A method of processing information relating to a mobile telephone, the method comprising:

establishing wireless communication between a home mobile telephone network and the mobile telephone when the mobile telephone has a location such that the mobile telephone is registered with the home mobile telephone network; and establishing wireless communication between a visitor mobile telephone network and the mobile telephone when the mobile telephone has a location such that the mobile telephone is registered with the visitor mobile telephone network; and storing a first service profile for the mobile telephone and a second service profile for the mobile telephone which is different than the first service profile in a database record, the database record being a part of the home mobile telephone network; and wherein one of the first and second service profiles is automatically selected for controlling operation of the mobile telephone based on which one of the home and visitor mobile telephone networks the mobile telephone is currently registered to so that the first service profile is automatically selected if the mobile telephone is currently registered to the home mobile telephone network and the second service profile is automatically selected if the mobile telephone is currently registered to the visitor mobile telephone network.

21. A system as in claim 12, wherein the characteristic of the circumstances of the subscriber's mobile telephone that is detected is the identity of which mobile telephone network the subscriber's mobile telephone is currently registered to such that the first service profile is selected by the means for selecting and transmitted by the means for transmitting when the subscriber's mobile telephone is currently registered with said mobile telephone network and the second service profile is selected by the means for selecting and transmitted by the means for transmitting when the subscriber's mobile telephone is currently registered with another mobile telephone network.

* * * * *